(12) United States Patent
Bade et al.

(10) Patent No.: US 11,598,243 B2
(45) Date of Patent: Mar. 7, 2023

(54) FOUR-STROKE OPPOSED PISTON ENGINE ARCHITECTURE AND RELATED METHODS

(71) Applicant: Enginuity Power Systems, Inc., Alexandria, VA (US)

(72) Inventors: Mehar Bade, Clinton Township, MI (US); William Vincent Meyers, Jr., Sherwood Forest, MD (US); James Warren, Alexandria, VA (US)

( * ) Notice: Subject to any disclaimer, the term of this patent is extended or adjusted under 35 U.S.C. 154(b) by 0 days.

(21) Appl. No.: 17/151,253

(22) Filed: Jan. 18, 2021

(65) Prior Publication Data

US 2021/0262381 A1  Aug. 26, 2021

Related U.S. Application Data

(63) Continuation-in-part of application No. 16/875,963, filed on May 15, 2020, now Pat. No. 10,955,168.

(60) Provisional application No. 62/980,167, filed on Feb. 22, 2020.

(51) Int. Cl.
*F01P 3/02* (2006.01)
*F02B 75/28* (2006.01)

(52) U.S. Cl.
CPC .............. *F01P 3/02* (2013.01); *F02B 75/282* (2013.01); *F01P 2003/022* (2013.01)

(58) Field of Classification Search
CPC .. F02B 75/26; F02B 75/28; F02B 2075/1812; F02B 2075/027; F01B 3/0005
See application file for complete search history.

(56) References Cited

U.S. PATENT DOCUMENTS

| | | | | |
|---|---|---|---|---|
| 2,334,917 A * | 11/1943 | Ford | ........................ | F01B 7/14 123/DIG. 1 |
| 4,834,032 A * | 5/1989 | Brennan | ............... | F02F 7/0014 417/521 |
| 5,261,357 A * | 11/1993 | Suh | ........................ | F02F 7/0007 123/41.57 |
| 5,408,965 A | 4/1995 | Fulton | | |
| 5,533,472 A | 7/1996 | Sands | | |
| 6,118,194 A * | 9/2000 | Kawamura | .......... | H02K 7/1815 310/74 |
| 6,715,474 B1 | 4/2004 | Sasaki | | |
| 6,957,632 B1 | 10/2005 | Carlson | | |
| 7,004,120 B2 * | 2/2006 | Warren | ................. | F02B 75/282 123/43 R |
| 7,448,352 B2 * | 11/2008 | Warren | ................. | F02B 75/282 123/143 R |
| 8,113,164 B2 * | 2/2012 | Warren | ................. | F02B 75/282 123/146.5 R |
| 8,161,924 B1 * | 4/2012 | Lockshaw | ............. | F01B 13/061 123/204 |
| 8,286,596 B2 * | 10/2012 | Lemke | .................... | F02F 1/186 123/41.35 |
| 8,593,004 B2 * | 11/2013 | Piccinini | ............. | F03B 13/1865 290/53 |
| 8,669,670 B2 * | 3/2014 | Donnelly | ................ | F02C 3/085 60/39.15 |
| 9,708,910 B2 * | 7/2017 | Jorda | .................... | F02B 75/282 |

(Continued)

*Primary Examiner* — Shafiq Mian
(74) *Attorney, Agent, or Firm* — Capitol Patent & Trademark Law Firm, PLLC

(57) ABSTRACT

Compact and quiet opposed piston engines (OPEs) are provided. Though compact and quiet, the OPEs provide substantial mechanical shaft power that is required for a range of applications. The inventive OPEs may have a plurality of size displacements.

20 Claims, 11 Drawing Sheets

(56) References Cited

U.S. PATENT DOCUMENTS

| | | | |
|---|---|---|---|
| 9,708,976 B1* | 7/2017 | Warren | F02B 75/282 |
| 9,869,244 B2* | 1/2018 | Warren | H01T 13/32 |
| 2004/0221823 A1* | 11/2004 | Warren | F02B 75/282 |
| | | | 123/51 AA |
| 2012/0204841 A1 | 8/2012 | Hofbauer | |
| 2013/0047616 A1* | 2/2013 | Holmes | F24D 11/009 |
| | | | 60/670 |
| 2013/0139507 A1* | 6/2013 | Morse | F02G 5/00 |
| | | | 60/624 |
| 2015/0007783 A1 | 1/2015 | Bilezikjian et al. | |
| 2017/0241332 A1* | 8/2017 | Warren | F01L 5/04 |
| 2020/0348045 A1* | 11/2020 | Warren | F24H 1/208 |

\* cited by examiner

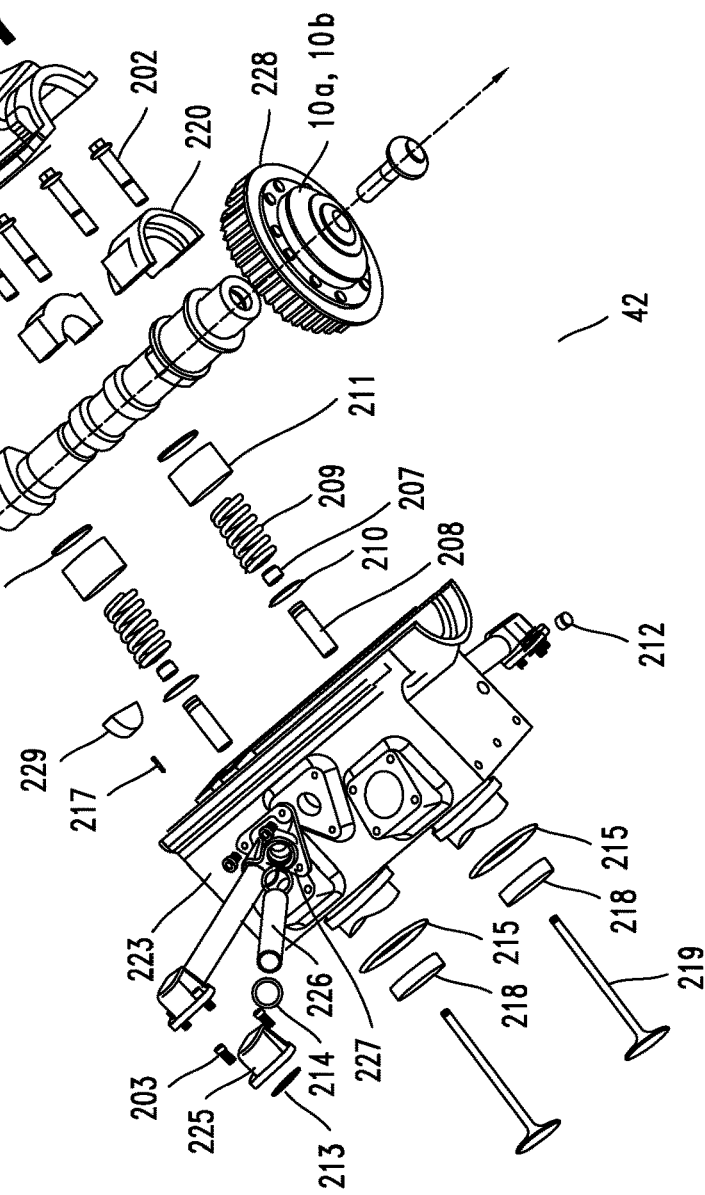
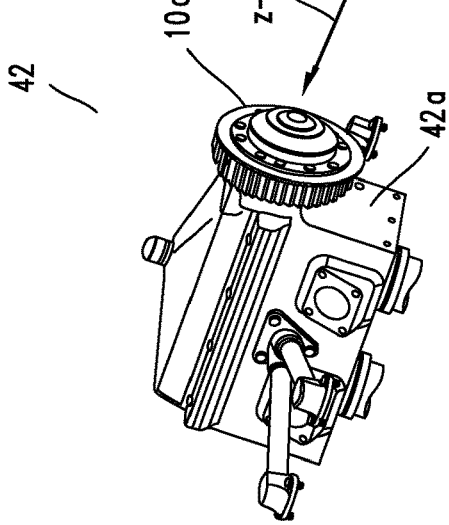
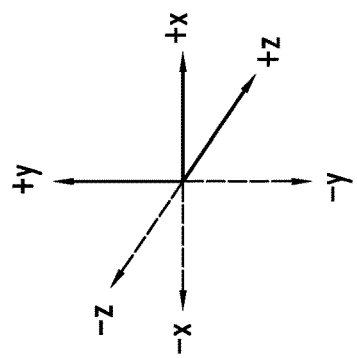

FIG. 8

| ITEM# | TYPE | DESC. |
|---|---|---|
| 101 | PART | VALVE, SHIM, EJ205 |
| 102 | PART | FRONT CAM CAP BOLT, M6x1 SH, EJ205 |
| 103 | PART | 10-24 x .525 SHCS |
| 104 | PART | CAM CAP BOLT, M8x1.25 SH EJ205 |
| 105 | PART | CAM GEAR BOLT, M12x1.5 EJ205 |
| 106 | PART | INTAKE VALVE SEAL, EJ205 |
| 107 | PART | INTAKE VALVE GUIDE, EJ205 |
| 108 | PART | VALVE SPRING, EJ205 |
| 109 | PART | SPRING SEAT, EJ205 |
| 110 | PART | BUCKET LIFTER, EJ205 |
| 111 | PART | 1/4-IN NPT PLUG |
| 112 | PART | 1/8-IN NPT PLUG |
| 113 | PART | O-RING 2-020, VITON |
| 114 | PART | O-RING 2-135, VITON |
| 115 | PART | 1/16 x 1/2 DOWEL |
| 116 | PART | SEAT 35MM |
| 117 | ASSEMBLY | OIL DRAINBACK, MANIFOLD |
| 118 | PART | INTAKE VALVE, 35MM |
| 119 | PART | CAM BRG/SEAL CAP |
| 120 | PART | CAM BEARING CAP |
| 121 | PART | INTAKE CAM, SUBARU EJ205 BASED |
| 122 | PART | INTAKE CAM HOUSING |
| 123 | PART | VALVE COVER, INTAKE |
| 124 | ASSEMBLY | CAM PULLEY ASSY |
| 125 | PART | CAM BORE PLUG |
| 126 | PART | 1/4-28 HEX NUT |
| 127 | PART | HALL EFFECT SENSOR |

FIG. 9

| ITEM# | TYPE | DESC. |
|---|---|---|
| 201 | PART | VALVE, SHIM, EJ205 |
| 202 | PART | FRONT CAM CAP BOLT, M5x1 SH, EJ205 |
| 203 | PART | 10-24 x .44 SHCS |
| 204 | PART | 10-24 x .625 SHCS |
| 205 | PART | CAM CAP BOLT, M8x1.25 SH EJ205 |
| 206 | PART | CAM GEAR BOLT, M12x1.5 EJ205 |
| 207 | PART | INTAKE VALVE SEAL, EJ205 |
| 208 | PART | INTAKE VALVE GUIDE, EJ205 |
| 209 | PART | VALVE SPRING, EJ205 |
| 210 | PART | SPRING SEAT, EJ205 |
| 211 | PART | BUCKET LIFTER, EJ205 |
| 212 | PART | 1/8-IN NPT PLUG |
| 213 | PART | O-RING 2-020, VITON |
| 214 | PART | O-RING 2-124, VITON |
| 215 | PART | O-RING 2-135, VITON |
| 216 | PART | -08 AN WELD FITTING |
| 217 | PART | 1/16 x 1/2 DOWEL |
| 218 | PART | SEAT 35MM |
| 219 | PART | VALVE, 35MM |
| 220 | PART | CAM BRG/SEAL CAP |
| 221 | PART | CAM BEARING CAP |
| 222 | PART | EXHAUST CAM, SUBARU EJ205 BASED |
| 223 | PART | EXHAUST CAM HOUSING |
| 224 | PART | VALVE COVER, EXHAUST |
| 225 | PART | OIL DRAIN TUBE, CRANKCASE END |
| 226 | PART | OIL DRAIN TUBE, MAN END |
| 227 | PART | OIL DRAIN TUBE, CRANKCASE |
| 228 | ASSEMBLY | CAM PULLEY ASSY |
| 229 | PART | CAM BORE PLUG |

FOUR-STROKE OPPOSED PISTON ENGINE ARCHITECTURE AND RELATED METHODS

RELATED APPLICATIONS

This application is a continuation-in-part of U.S. Non-Provisional application Ser. No. 16/875,963, filed May 15, 2020 (the "'963 application"). This application claims priority to the '963 application and to U.S. Provisional Application 62/980,167 filed Feb. 22, 2020 (the "'167 application"). This application also incorporates by reference the entire disclosures set forth in the '167 and '963 applications as well as the entirety of the disclosures set forth in U.S. Pat. Nos. 7,004,120, 7,448,352, 8,113,164, 9,708910, 9,708,976 and 9,869,244.

TECHNICAL FIELD

This disclosure relates to the field of inwardly opposed piston engines (OPEs) and their applications, and more specifically to OPEs that provide a substantial reduction in vibration and size without compromising on power, density (size & weight), performance, and fuel economy.

INTRODUCTION

This section introduces aspects that may help facilitate a better understanding of the inventions. Accordingly, the statements of this section are to be read in this light and are not to be understood as admissions about what is, or what is not, prior art.

To date, it has been challenging to produce an OPE that provides sufficient power for a range of applications, yet is quiet, small in size and reliable.

Accordingly, it is desirable to provide solutions to this challenge.

SUMMARY

The inventors describe various exemplary, inventive OPEs. The inventive OPEs include inventive configurations that integrate modular intake and exhaust assemblies, and reduce the amount of vibrations typically expected in traditional piston engines, among other things.

In one embodiment, an inventive OPE may comprise a four-stroke opposed OPE that comprises: one or more cylinders, each cylinder comprising a pair of inwardly opposed pistons; a cooling jacket configured to cool the one or more cylinders, and comprising one or more fins to increase the surface area of the cooling jacket to expose coolant flowing inside the jacket to air; and an intake aperture in each of the one or more cylinders for receiving a removable, modular intake valve assembly that enables a flow of combustion air into an interior of the cylinder, and an exhaust aperture in each of the one or more cylinders for receiving a removable, modular exhaust valve assembly that enables a flow of exhaust and combustion by-products out of the interior of the cylinder.

Each of the one or more cylinders may further comprise a section surrounding a substantially circular or oval opening in the cylinder for receiving an engine connection element, such a sleeve that is configured to allow better energy transfer from a spark plug inserted into the sleeve to the cylinder, for example.

The inventive OPE may be further configured to comprise one or more camshafts positioned above and/or below a center point of the OPE.

Yet further, the inventive OPE may comprise an engine connection element configured to hold an engine component, where the engine component may comprise one of a pressure transducer assembly, glow plug assembly, spark plug, or glow plug direct fuel injector.

Still further, the inventive OPE may comprise a crankshaft counter weight for balancing a crankshaft comprising a mass substantially equal to a mass needed to address a rotating mass and rotational movement of the crankshaft.

In addition to the features set forth above, an inventive OPE may comprise (i) one or more oil supply jets for distributing pressurized oil to internal parts of the OPE in a pattern, where the internal parts may comprise pistons or connecting rods, for example; (ii) an internal heat exchanger embedded within an oil pan; (iii) a stepper motor configured to control operation of a guide valve to direct flow of a first coolant percentage of a coolant to the cooling jacket and direct a second coolant percentage of the coolant to an external heat exchanger; and (iv) an engine control subsystem (e.g., motor controller, microcontroller, programmable controller) for controlling the stepper motor that generates one or more stepper motor, coolant control signals based on a measured or sensed temperature.

In embodiments of the invention the cooling jacket may be an integral one piece jacket, may be a plurality of separate, cooling elements and may be configured to surround the one or more cylinders. Alternatively, when an OPE comprises a plurality of cylinders, then the cooling jacket may comprise a number of cooling jackets, each configured to surround at least one of the one or more cylinders.

In addition to inventive OPEs, the present inventors provide for inventive methods that relate to such OPEs. For example, one inventive method for cooling a four-stroke OPE may comprise: configuring a cooling jacket to surround and cool one or more cylinders of the OPE, each cylinder comprising a pair of inwardly opposed pistons, and configuring the cooling jacket to comprise one or more fins to increase the surface area of the cooling jacket to expose coolant flowing inside the jacket to air.

Such an inventive method may further comprise controlling the operation of a guide valve that directs flow of a first coolant percentage to the cooling jacket and directs a second coolant percentage to an external heat exchanger using a stepper moto, and/or controlling the stepper motor using an engine control subsystem that generates one or more stepper motor, coolant control signals based on a measured or sensed temperature.

Another inventive method is a method for configuring an OPE without a piston head. Such an inventive method may comprise: configuring the OPE with an intake aperture in each of one or more cylinders; configuring the OPE with an exhaust aperture in each of the one or more cylinders; receiving a removable, modular intake valve assembly in the intake aperture that enables a flow of combustion air into an interior of the cylinder, and receiving a removable, modular exhaust valve assembly in the exhaust aperture that enables a flow of exhaust and combustion by-products out of the interior of the cylinder.

The inventive OPEs and methods described above are just some of the inventive OPEs and methods that will be apparent from the discussion herein.

BRIEF DESCRIPTION OF THE DRAWINGS

The present invention is illustrated by way of example and is not limited by the accompanying figures in which like reference numerals indicate similar elements and in which:

FIGS. 4A and 4B depict a removable intake valve assembly while FIGS. 4C and 4D depict a removable exhaust assembly for a two-cylinder OPE according to embodiments of the invention. It should be noted that components of the assemblies shown in FIGS. 4A to 4D may be incorporated into an OPE having more than two cylinders.

FIGS. 8 and 9 provide separate listings of other components making up, or associated with, the intake valve assembly (FIG. 8) or exhaust valve assembly (FIG. 9) depicted in FIGS. 4A to 4D.

Figure 1:
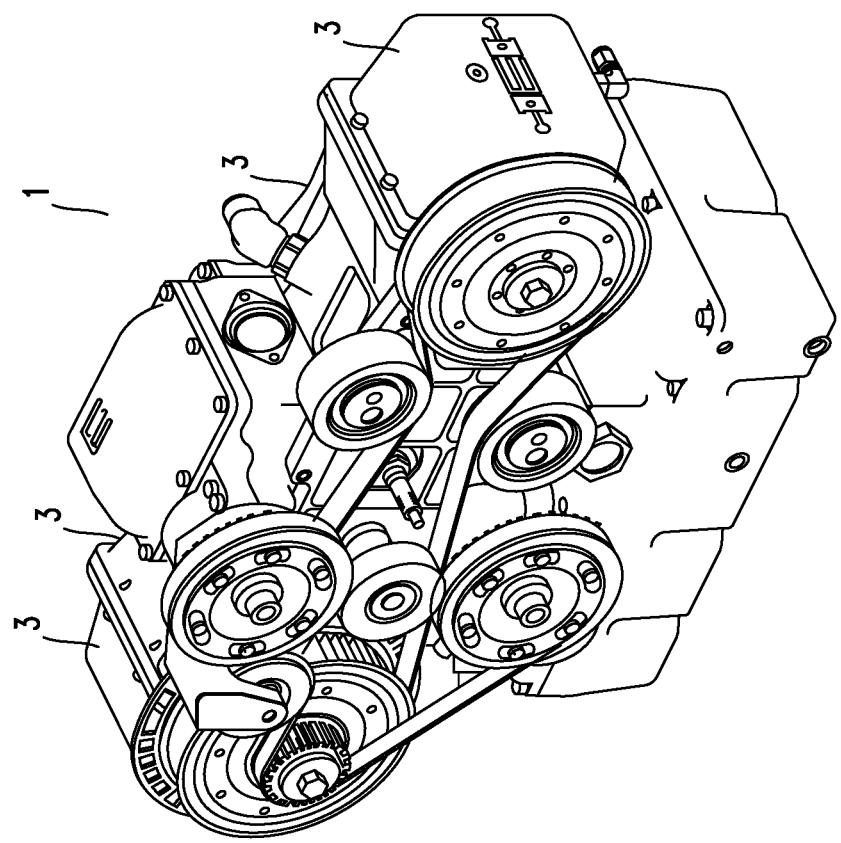
FIG. 1 depicts an isometric view of an inventive, single cylinder OPE according to one embodiment of the present invention

Specific embodiments of the present invention are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a more clear presentation of embodiments may be achieved.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EXEMPLARY EMBODIMENTS

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

As used herein and in the appended claims, the term "comprises," "comprising," or variations thereof are intended to refer to a non-exclusive inclusion, such that a process, method, article of manufacture, or apparatus (e.g., an OPE) that comprises a list of elements does not include only those elements in the list, but may include other elements not expressly listed or inherent to such process, method, article of manufacture, or apparatus.

The terms "a" or "an", as used herein, are defined as one, or more than one. The term "plurality", as used herein, is defined as two, or more than two. The term "another", as used herein, is defined as at least a second or more.

Unless otherwise indicated herein, the use of relational terms, if any, such as "first" and "second", "top" and "bottom", "back" and "front", and "left" and "right" and the like are used solely to distinguish one view, entity or action from another view, entity or action without necessarily requiring or implying any actual such relationship, order or importance between such views, entities or actions.

The terms "including" and/or "having", as used herein, are defined as comprising (i.e., open language).

As used herein "x-axis" or "first axis", "y-axis" or "second axis" and "z-axis" or "third axis" mean three different geometric directions and planes. Typically, the x-axis is used to indicate motion in a horizontal direction/plane, the y-axis is used to indicate motion in the vertical direction/plane and the z-axis is used to indicate motion in an axis that is perpendicular to both the x and y axes. However, depending on the orientation and supporting structure of an OPE and the origin of the three axes may be interchangeable.

As used herein the phrase "operable to" means "functions to" unless the context or knowledge of one skilled in the art indicates otherwise.

Similar reference characters denote similar features consistently throughout the attached drawings.

As described in more detail herein, inventive, four-stroke OPEs may incorporate a number of inventive features. For example, some of the inventive OPEs include modular, removable intake and exhaust valve assemblies that meet many of the stringent emissions regulations currently in effect and those being proposed or promulgated by various federal and state agencies—a feat not practical with existing opposed piston engines. In addition, inventive OPEs are configured such that thermal losses are minimized while still meeting or exceeding nitrogen oxide (NOx) and particulate emission standards. For example, the inventive OPEs described herein (e.g., a four stroke OPE) more completely consume fuel versus traditional two stroke engines which, in turn, leads to lower emissions. In a conventional two-stroke design, some percentage (20%-35%) of the fuel from the intake is scavenged directly into the exhaust prior to combustion. However, these scavenging or direct entrainment of fuel from intake to exhaust are eliminated in this novel four stroke OPE.

The inventive modular, removable valve train assemblies (e.g., intake and exhaust assemblies) allow for ease of servicing, lowered production costs. In embodiments the modular intake and exhaust housings may be directly affixed (connected) to a cylinder, thus increasing the overall simplicity and practicality of the inventive OPEs. That is to say, because the inventive OPEs do not need to incorporate a cylinder head, the intake and exhaust assemblies are directly connected to the engine block, rather than be connected to the head. As a result, the inventive OPEs may be more compact and weigh less than traditional engines.

Still further, as described in more detail herein, inventive OPEs are configured to reduce vibrations typically found in existing piston engines by, among other things, incorporating inventive crank balancing designs. The reduction in vibrations is believed to lessen the "wear and tear" on OPE components, thus extending the life-time of the inventive OPEs. These and other features will now be discussed in more detail.

Figure 2:
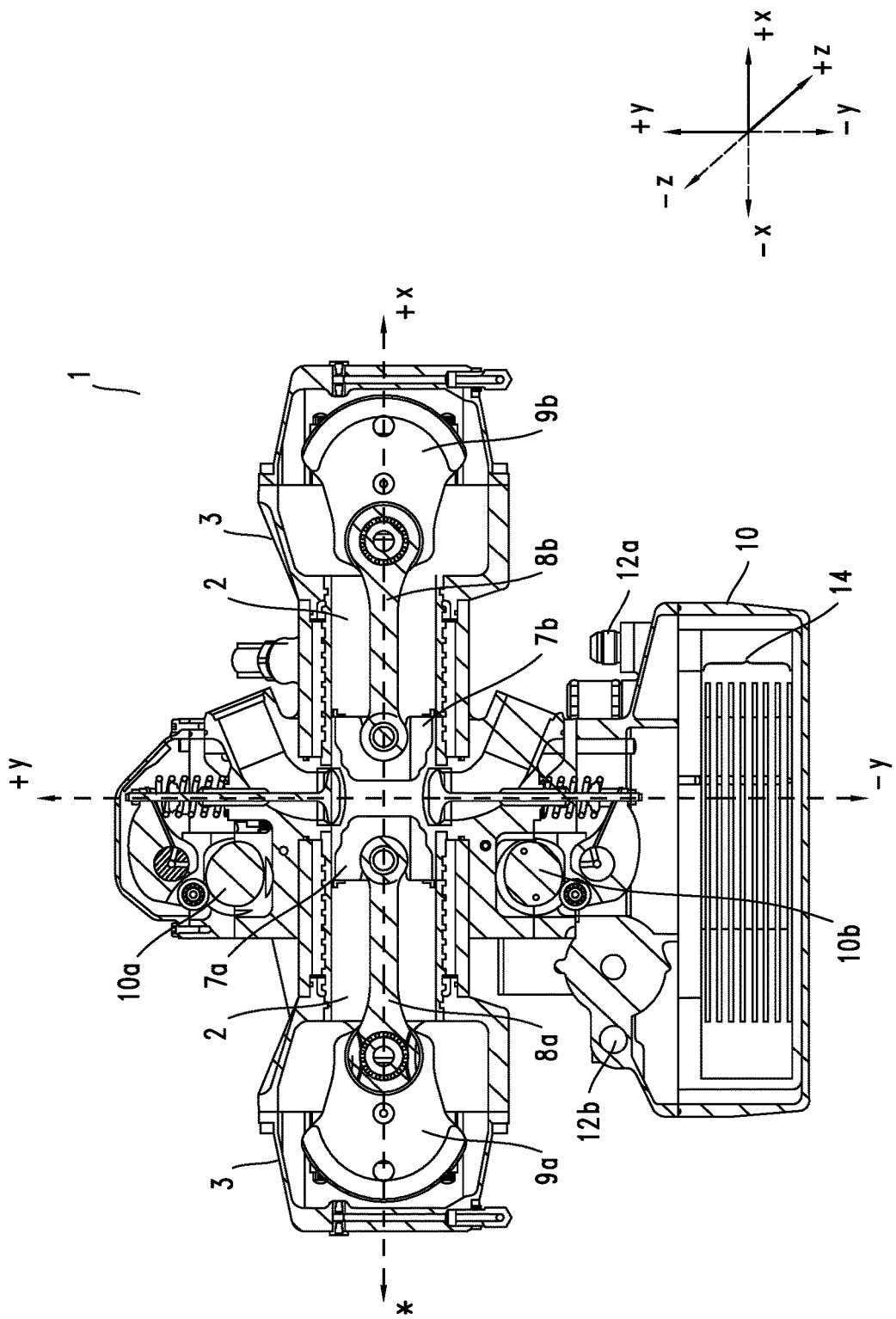
FIG. 2 depicts a cut-a-way view of an inventive, single cylinder OPE according to an embodiment of the invention. It should be noted that the design of the OPE shown in FIGS. 1 and 2 may be applicable to an OPE having a plurality of cylinders.

Referring now to FIG. 1, there is depicted an inventive OPE 1 according to one embodiment of the present invention while FIG. 2 depicts a cut away view of the OPE 1 shown in FIG. 1.

The OPE 1 may comprise a four-cycle or four-stroke engine and while the figures may show only one cylinder 2 of the engine 1 for clarity, it should be understood that one or more cylinders may be utilized depending on the amount of power desired to be produced by the OPE 1 (e.g., two or more cylinders). That said, it should be understood that the structural arrangements and operating principles described herein may alternatively be applied to an inventive, two-stroke OPE. In an embodiment, each cylinder comprises one or more inwardly opposed pistons (see FIG. 2, elements 7a, 7b).

In embodiments of the invention, the inventive OPEs described herein may be configured to provide 0.5 kilowatt to 1.0 megawatts of power and be configured to have a displacement range of 24.8 cc to 500 liters, for example.

An exemplary engine housing 3 may enclose engine pistons, crankshafts, connecting rods, gear trains, and portions of the output shafts and other engine components which are operatively coupled to the pistons as may be described herein (see FIG. 2, for example). The engine housing 3 may also serve as a base onto which other portions of the engine or other devices powered by, or connected to, the OPE 1 may be mounted or secured. The exemplary housing 3 shown in FIG. 1 accommodates a single pair of opposed pistons 7a, 7b (see FIG. 2) and associated engine components which are operatively coupled to the pistons. However, the engine housing 3 may be configured to accommodate more than one pair of opposed pistons according to the requirements of a particular application, for example.

In embodiments, the housing 3 may be a single component or comprise multiple sections (e.g., two or three sections) and may be formed by casting, machining, and other similar processes, for example. Further, the housing 3 (and/or its sections) may be formed from steel, aluminum, or any other suitable material or materials. If the housing 3 comprises multiple sections then each section may be formed separately and then attached, or connected to (collectively "connected to") one another using a suitable method. In one particular embodiment, sections of a housing may be welded together, for example. Alternatively, bolts or other removable fasteners may be used to connect sections of an inventive housing. Such attachment methods enable a housing and its respective sections to be varied in size such that the overall size of an inventive housing may also be varied in size to meet a range of desired engine configurations. If desired, suitable gaskets or seals may (not shown in figures) be positioned along any seams between joined sections of an engine housing to prevent the escape of lubricating oil and gases from the interior of the housing. The housing 3 may be secured to a frame or to another portion of a larger device (e.g., hot water tank, vehicle) or to other engine components (e.g., catalytic converter, muffler), for example, using bolts, welds, or any other suitable mechanism.

As noted above, due to the fact that the size of the housing 3 can be varied the desired number of cylinders can also be varied to meet specific power requirements, for example. Accordingly, as previously noted, the inventive OPEs described herein may be configured to provide 0.5 kilowatt to 1.0 megawatts of power and be configured to have a displacement range of 24.8 cc to 500 liters, for example.

Referring now to FIG. 2, the inventive OPE 1 is depicted with two, inwardly opposed pistons 7a, 7b connected to respective crankshafts 9a, 9b by respective connecting rods 8a, 8b, for example, within a cylinder 2 of housing 3. Pistons 7a, 7b are configured to move within cylinder 2 to rotate the crankshafts 9a, 9b via rods 8a, 8b. Each associated crankshaft 9a, 9b and/or connecting rod 8a, 8b may be configured to aid in providing a predetermined stroke length to its associated piston 7a, 7b, respectively, residing within the cylinder 2. Also shown in FIG. 2 is an oil pan 10 comprising an internal heat exchanger 14 that is discussed elsewhere herein.

Continuing, the opposed first and second pistons 7a, 7b may have predetermined lengths and predetermined diameters. In one embodiment, the stroke length of each of pistons 7a, 7b may be twice the amount of a conventional engine, for example. Thus, the total difference between the spacing of the pistons at closest approach to each other (i.e., at "top dead center") and the maximum spacing of the pistons during the engine cycle (i.e., at "bottom dead center") may also be twice the amount of a conventional engine, for example.

Figure 3A:
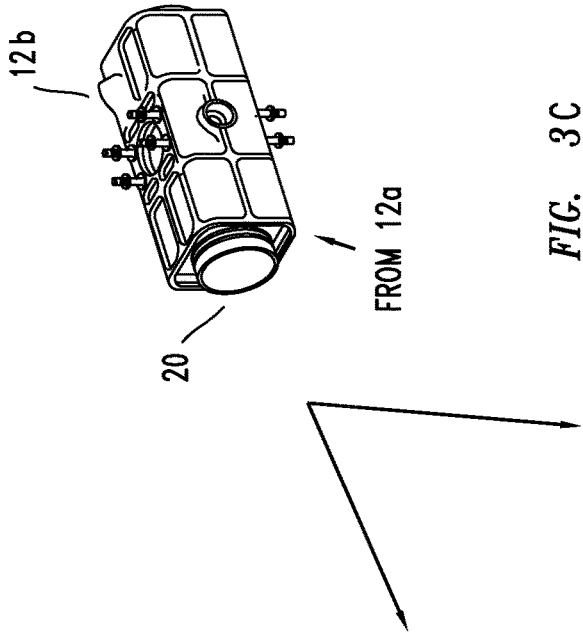
FIGS. 3A to 3E depict an inventive cylinder assembly and its elements according to an embodiment of the invention.
Figure 3C:
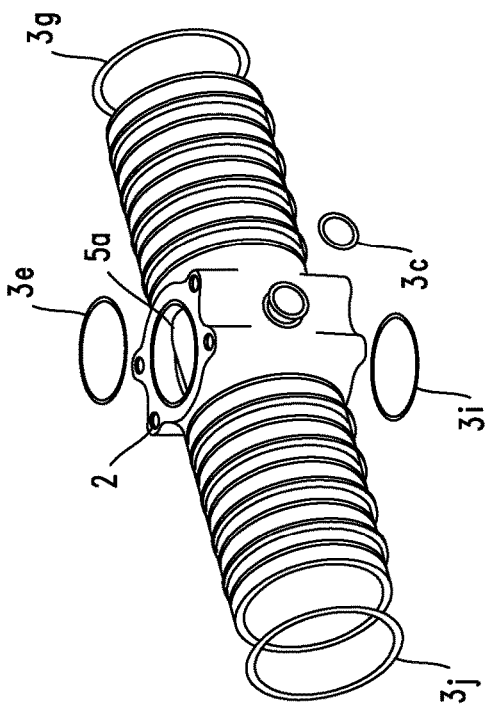

The piston lengths may be geometrically determined in accordance with the piston stroke length and the lengths of apertures formed in a wall of the cylinders through which flow exhaust gases and air for combustion (e.g., see element 5a in FIG. 3C). In addition, first and second piston caps (not shown) may be attached to faces of associated ones of pistons 7a, 7b (or to associated, optional piston spacers (not shown) in an embodiment where spacers are used). In one embodiment, each piston cap may be formed from a sandwich of two sheets of carbon fiber with a ceramic center. The piston caps exposed to a combustion event may be slightly concave in form so that when the two piston caps meet in the center of the cylinder 2 they form a somewhat spherical combustion chamber, though it should be noted that only the ceramic cores of the piston caps actually come into contact with an interior wall of the cylinder 2. Further, it should be understood that a spherical combustion shaped chamber is only one of the many shapes that piston caps included in an inventive OPE may be designed to form. Said another way, piston caps included in an inventive OPE may form a plurality of different shaped combustion chambers, for example, hour glass design, asymmetrical, symmetrical, pent roof to name just a few of the different shapes.

In embodiments, each piston 7a, 7b may have a length from a piston fire ring to the cap suitable for keeping the piston rings out of cylinder apertures. Optional spacers, and piston caps may each have a diameter roughly equal to the interior of the associated cylinder 2, and may be made of carbon fiber, ceramic, or any other suitable material to aid in minimizing thermal inefficiencies during engine operation.

Figure 3B:
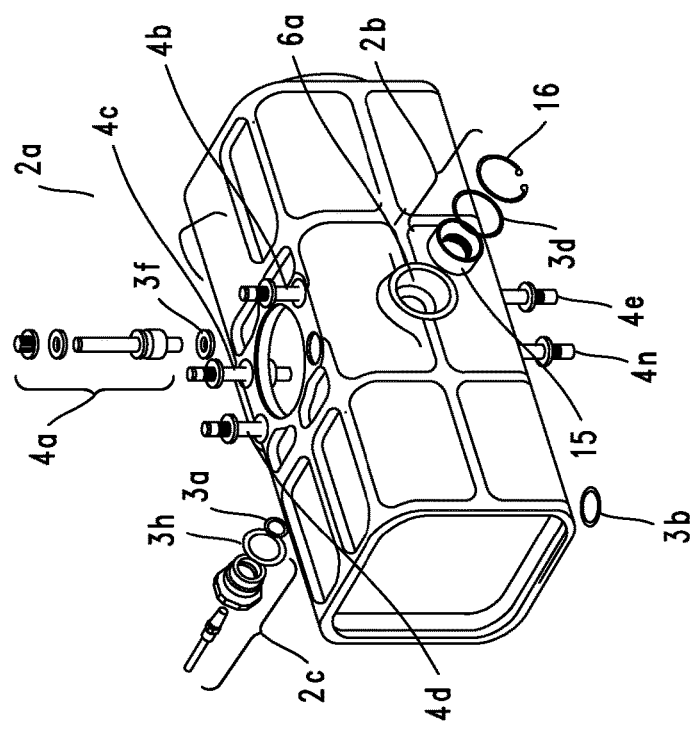

Referring to FIGS. 3A to 3C there is depicted an exemplary inventive cylinder assembly 20. As shown in FIGS. 3B and 3C, the assembly 20 may comprise: (i) a plurality of O-rings 3a to 3j, each operable to form a seal between components of the assembly 20 and/or components connected to the assembly 20 in order to prevent gases or liquids from escaping and/or entering the assembly 20, for example; (ii) a plurality of cam connection elements 4a to 4n (where "n" represents the last element), each element comprising a combination of washer, nut and stud, for example, operable to connect a portion of a respective cam to pistons within the assembly 20 (not shown), (iii) cylinder 2, (iv) cooling jacket 2a, (v) one or more spark plug connection components 2b where each may comprise a combination of a sleeve or grommet (collectively "sleeve") 15, retaining ring 16 and an O-ring 3d, for example, and one or more optional ports, each port for inserting a respective engine connection element 2c and configured to hold an engine component (e.g. a pressure transducer assembly, glow plug assembly, spark plug, glow plug direct fuel injector, or another assembly that aids in the actual combustion process or for understanding the combustion process) and connect the component to the cylinder 2. In the embodiment depicted in FIG. 3B the element 2c may comprise a spark plug connection element though this is merely exemplary. Such a spark plug connection element 2c may comprise a combination of a sleeve, and O-rings 3a, 3h, for example. In an embodiment, the sleeve 15 may function as a heat sink in order to transfer heat from the spark plug (not shown) during operation of the inventive OPE 1. In an embodiment, the sleeve 15 may be composed of a copper, for example. Also shown in FIG. 3A are a coolant outlet 12b that is connected to (or made a part of) the jacket 2a and an indication of the flow of a coolant into a coolant inlet 12a that is connected to (or made a part of) the jacket 2a (the inlet 12a is not shown because it is on the bottom of the jacket 2a which is hidden in FIG. 3A). In embodiments the cooling jacket 2a may be an integral one piece jacket, or may be composed of more than one piece. Further, the cooling jacket 2a may comprise a plurality of separate, cooling elements that are integrated together as one jacket. Still further, it should be understood that a single inventive cooling jacket may surround one or more cylinders (e.g., a plurality of cylinders), or, alternatively, a separate cooling jacket may surround an individual cylinder. Thus, an inventive OPE that comprises a plurality of cylinders may further comprise a number of cooling jackets, each configured to surround at least one of the one or more cylinders.

Figure 3E:
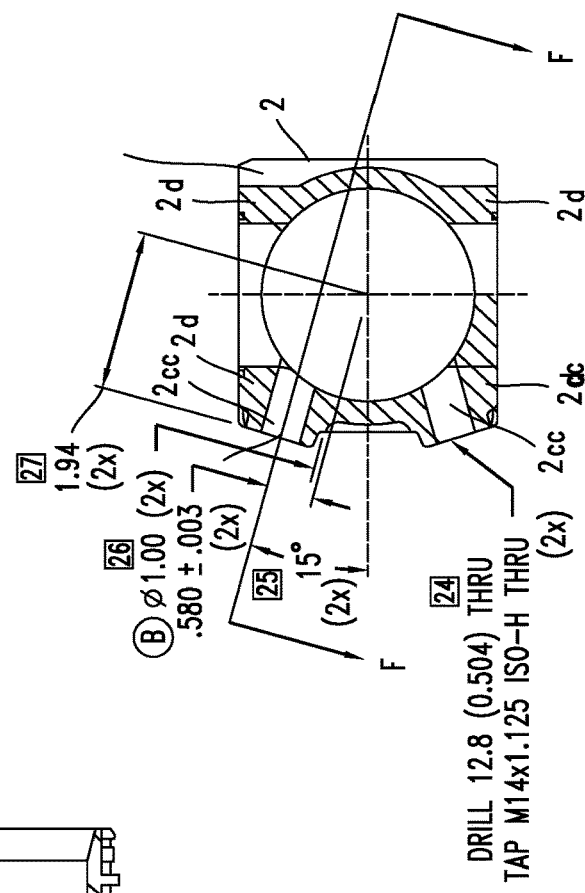
Figure 3D:
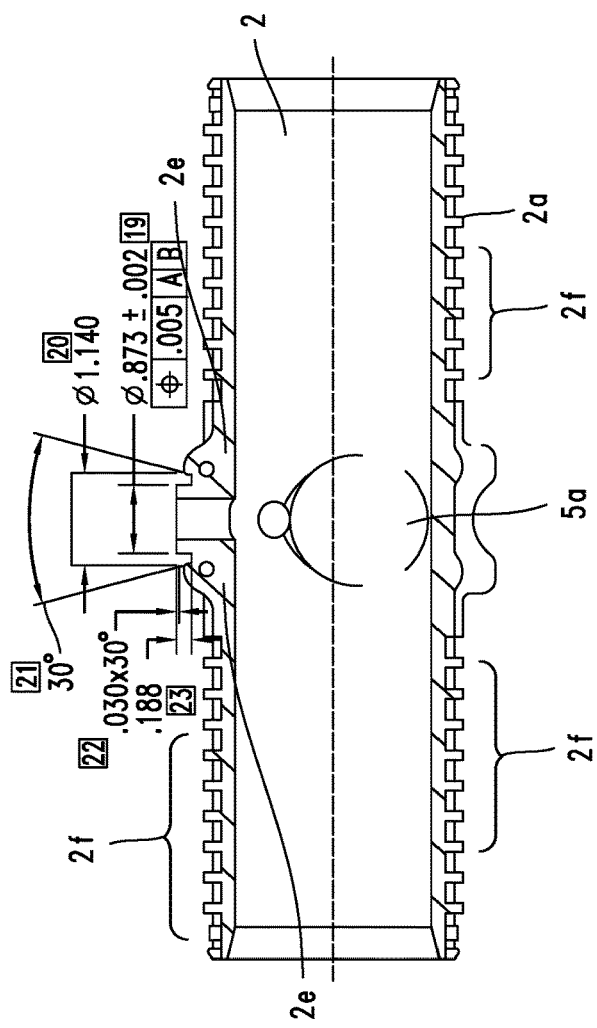

Referring to FIG. 3D, there is depicted a simplified drawing of the cylinder 2 and the cooling jacket 2a comprising one or more fins/valleys 2f (collectively "fins"). It should be noted that only some of the fins 2f are labeled in FIG. 3D for the sake of clarity, and, in addition, the shape and number of the fins 2f depicted are merely exemplary. For example, the fins 2f can be of a plurality of shapes and dimensions, such as rectangular, tapered, and/or conical.

FIG. 3E depicts a view of a portion of cylinder 2 that depicts two openings 2cc each configured to receive an engine component (not shown), such as a spark plug, glow plug, fuel injector, sensor (e.g., pressure, and other sensors), infrared camera, or another component that assists the combustion process or some combination of the components mentioned above). The openings 2cc may be formed in one or more walls 2d of the cylinder 2. In FIG. 3D, the cylinder 2 is depicted comprising a housing 2e that may be bolted or welded to engine housing 3, for example. Alternatively, other connection methods may be used. In embodiments cylinder housing 2e may be composed of aluminum, an aluminum alloy, steel, or any other suitable material using known processes such as casting, boring and finish machining, for example.

Figure 3F:
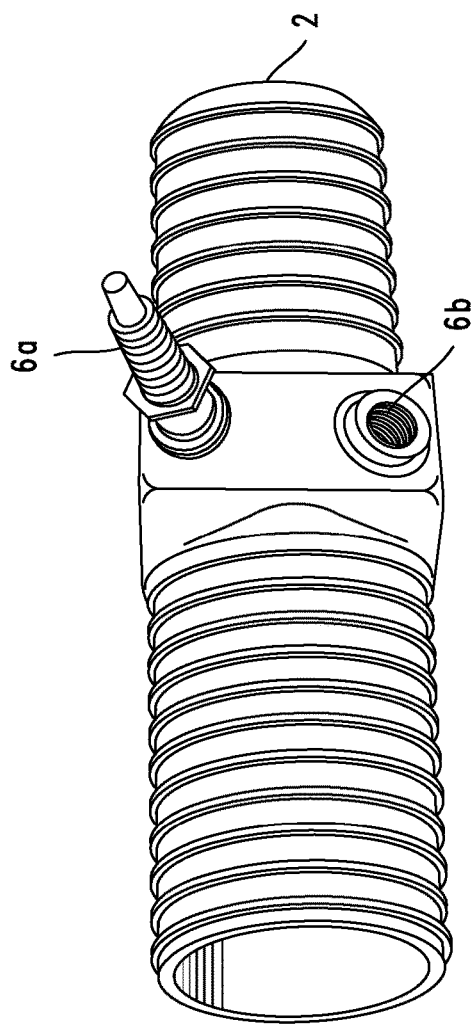
FIGS. 3F and 3G depict views of an inventive cylinder used in experiments according to an embodiment of the invention.

Referring now to FIG. 3F, one component (e.g., a spark plug, etc.) 6a is shown installed for illustrative purposes only, though a second component (e.g., spark plug, glow plug, fuel injector, various sensors, infrared camera or another component that assists the combustion process) may be inserted into opening 6b. Relatedly, it should be understood though while only a single connection element 2c is shown in FIG. 3B, it should be understood that multiple connection elements may be used along with a corresponding engine component (e.g., spark plug), it being understood that the type of components making up a connection element 2c may differ depending on the engine component that is to be connected to the cylinder 2.

Yet further, it should be understood that one or more spark plugs may be utilized as an ignition source in combination with compression ignition. In an embodiment, each spark plug may be connected to the cylinder 2 using a respective connection element 2c, for example. Once connected each spark plug may be operable to ignite a fuel-air mixture residing in a combustion chamber formed by the cylinder 2. In embodiments where a conventional spark plug is used, the spark plug may be coupled to a conventional distributor for controlling voltage to the spark plug. Any number of fuels may be used in the fuel air mixture such as kerosene, ethanol, gasoline, similar non-compression ignition fuels and/or compression ignition fuels with spark assist.

An exemplary sparkplug that may be used with the inventive OPE 1 may be a statically mounted element of an overall ignition source described in more detail U.S. Pat. No. 7,448,352, the disclosure of which is incorporated herein in full by reference. Other ignition sources suitable for the purposes described herein are disclosed in U.S. Pat. Nos. 8,113,164 and 9,869,244 the disclosures of which are all incorporated herein in full by reference. Other types of ignition sources (e.g., compression configurations) may also be incorporated into the inventive OPE 1.

During experimental operation of the inventive OPE 1, the inventors discovered that the temperatures of a spark plug may increase rapidly past the threshold temperature where ignition can be affected. Other times the temperature exceeded the limits of the spark plug's design parameters which led to degradation of the physical structure of the spark plug. Accordingly, in embodiments of the invention a section of the cylinder 2 that surrounds the substantially circular or oval opening 6b, for example, for receiving a spark-plug, for example, may be modified to include a connection element 2c that includes, for example, a sleeve, such as sleeve 15 described elsewhere herein. Upon installing a spark-plug into the sleeve 15, the sleeve 15 may be configured to allow better energy transfer from the spark plug to the cylinder 2 which acts as spark-plug heat sink, for example. As a result the temperature of the spark plug is reduced which, in turn, reduces the degradation of the spark-plug and lengthens its operational lifetime.

Backtracking somewhat, to aid in the control of the inventive OPE's 1 operating temperature the OPE 1 may comprise a cylinder 2 and a separate, external cooling jacket 2a (see FIGS. 3A, 3B and 3D) for cooling the cylinder by allowing coolant to flow freely in the jacket 2a. In FIG. 3A, coolant (e.g., water, glycol or a mixture) may enter the jacket 2a via inlet 12a and exit via outlet 12b (see also FIG. 7A). Such a configuration may also allow for simpler castings to be made while providing a greater surface area for the coolant to dissipate heat from the OPE 1. As indicated previously, the cooling jacket 2a may comprise one or more fins 2f of different size/shapes/dimensions to increase the surface area of the cooling jacket 2a in order to expose the coolant flowing inside the jacket 2a to air, thereby eliminating (in some cases) the need for a separate radiator.

Figure 3G:
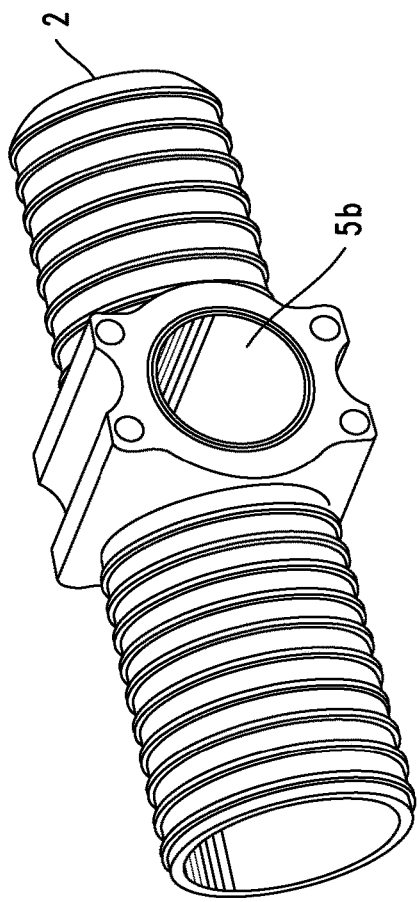

Referring back to FIG. 3C a valve assembly aperture 5a is depicted. Similar to other features discussed above, though only a single circular aperture 5a is shown it should be understood that multiple apertures of different shapes/sizes/inclination at multiple, different locations may be formed in the cylinder 2. For example, aperture 5a may be on the top of the cylinder 2 while another may be 180 degrees away from the on the bottom of the cylinder (see FIG. 3G for a second valve assembly aperture 5b, for example). In additional embodiments, the assembly 20 may comprise a cylinder 2 having valve assembly apertures that are positioned less than 180 degrees a part from one another.

In the configuration where the valve assemblies are positioned 180 degrees a part from one another (i.e., directly opposite one another across a shared combustion chamber), one skilled in the art will recognize that such a configuration may create a crossflow effect to maximize the intake and exhaust of gases, thus leading to measurable, improved performance.

In embodiments, either aperture 5a, 5b (in general, each of one or more apertures) may function as an intake aperture for receiving a removable, modular intake valve assembly (not shown, but see component 40 in FIGS. 4A and 4B) that is operable to enable a flow of combustion air into the interior of the cylinder 2 during an intake portion of a combustion cycle or as an exhaust aperture for receiving a removable, modular exhaust valve assembly (not shown, but see component 42 in FIGS. 4C and 4D) that is operable to enable a flow of exhaust and combustion by-products out of the interior of the cylinder 2 during an exhaust portion of the combustion cycle, for example.

Again, while the figures may show one configuration of an intake and exhaust aperture, a desired number of intake and exhaust apertures may be provided, having a desired shape and/or axial orientation with respect to each other and any desired spatial arrangement to meet the requirements of a particular engine configuration, depending on such factors as the geometry of the end-use envelope in which the engine is to be installed, and/or the air and exhaust volumetric flow rate requirements for the desired combustion reaction or cycle. Still further, the characteristics/shape/form of structures (e.g., the cylinder 2) surrounding the apertures 5a, 5b may be specified so as to enable the use of valves of a certain type or to enable the mounting of the valves at desired locations along the cylinder 2 to control intake and exhaust flow, and other pertinent factors. That is to say, the number, size, shape and locations of valve apertures may be varied and specified to meet the requirements of a particular OPE design (i.e., geometry and/or operation of an OPE, for example).

In embodiments of the invention the valves that are a part of a removable intake and/or exhaust valve assembly may be throttle valves, poppet valves (e.g., spring loaded poppet valves) or a desmodromic valve (e.g., a valve that is closed by a camming mechanism, rather than by a spring mechanism), for example. Other types of valves are also contemplated.

In an embodiment the cylinder 2 may be a replaceable, modular component of the OPE 1.

Figure 4B:
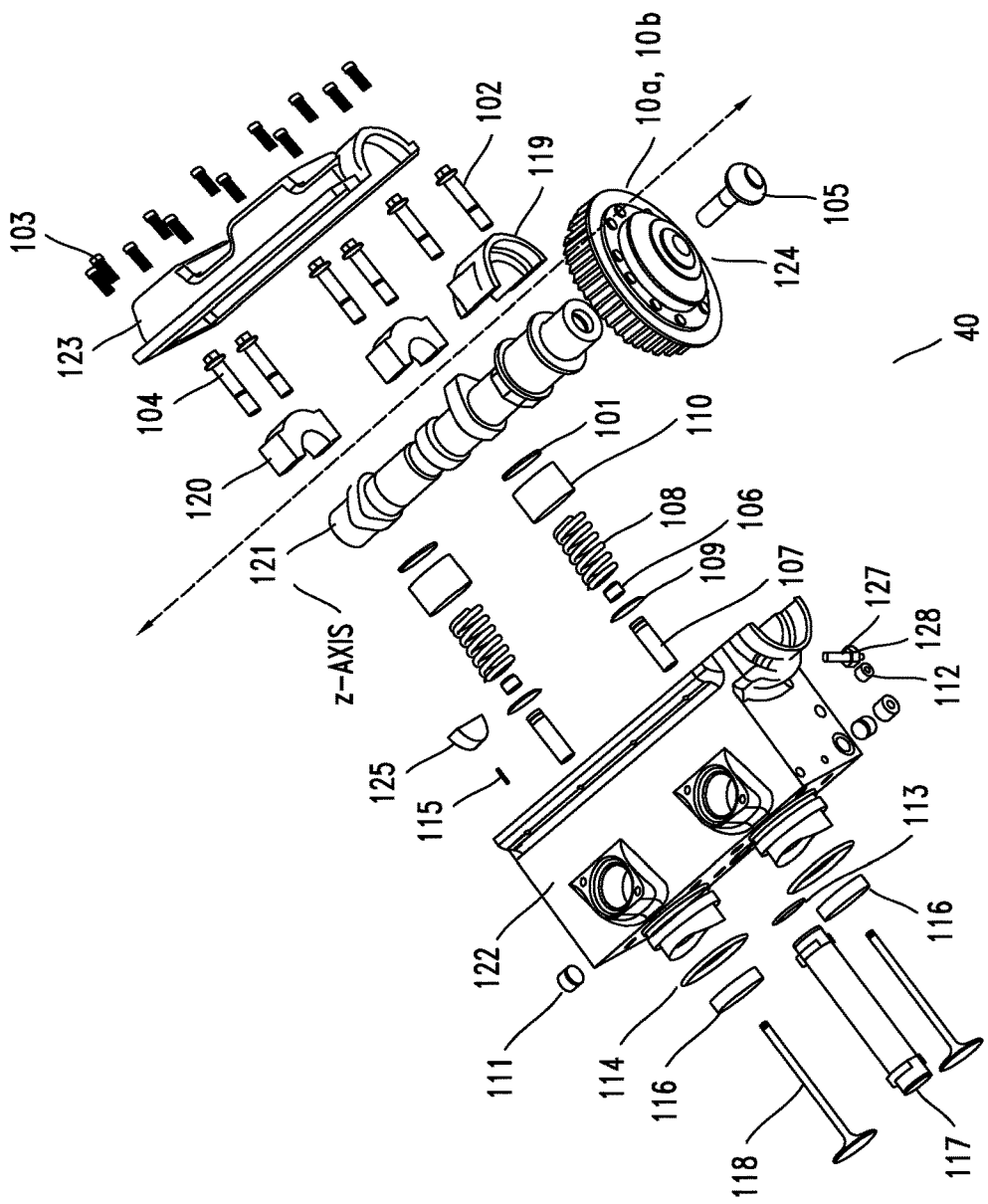
Figure 4A:
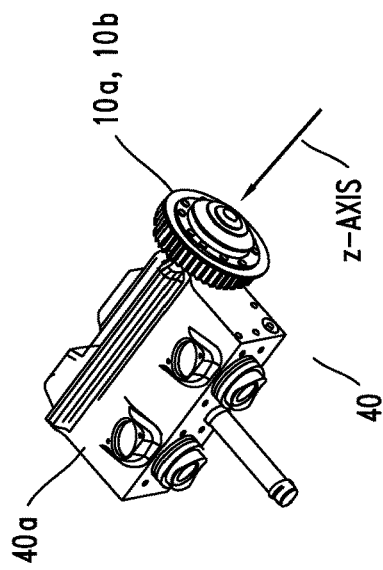

Referring now to FIGS. 4A and 4B there is depicted a view of a removable intake valve assembly 40 (FIG. 4A) and an exploded view of the assembly 40 (FIG. 4B), while in FIGS. 4C and 4D there is depicted a removable exhaust valve assembly 42 (FIG. 4C) and an exploded view of the assembly 42 (FIG. 4D).

In an embodiment, the OPE 1 may be configured to receive a removable intake valve assembly 40 within an intake aperture (such as aperture 5a in FIG. 3C or aperture 5b in FIG. 3G) in each of one or more cylinders of the OPE, and may be configured to receive a removable exhaust valve assembly 42 within an exhaust aperture (such as aperture 5a in FIG. 3C or aperture 5b in FIG. 3G) in each of the one or more cylinders.

In embodiments, each assembly 40, 42 may be separately, removably connected/disconnected to/from the cylinder 2 without the need to remove a cylinder head because such a head is not utilized by inventive OPEs provided by the present inventors. Accordingly, the inventors believe that maintenance or repair of an intake/exhaust valve may be more easily accomplished versus existing designs that require the removal of the cylinder head. For example, in an embodiment, to connect each of the assemblies 40, 42 to the cylinder 2 a respective valve body 40a, 42a of each assembly 40, 42 may be connected to the cylinder 2 by inserting a respective seat 116 (see FIG. 4B), 218 (see FIG. 4D) which may protrude from a respective assembly 40, 42. Accordingly, each body 40a, 42a becomes more of an external component and less of a central element of an inventive OPE as is the case when the cylinder head must be removed.

Each of the modular valve bodies 40a, 42a may be affixed into position using one or more bolts (not shown, e.g., four bolts in a single cylinder OPE). Said another way, the more the number of cylinders the more the number of bolts (e.g., the more the number of sets of four bolts).

Yet further, the specific method of actuating an intake or exhaust valve within each assembly 40, 42 and the geometry of the various internal components which make up an assembly 40, 42 may be configured to meet the fluid dynamics and mechanical aptitude of a given OPE design. For example, each of the modular valve assemblies 40, 42 may use a bucket style actuation, or, when a specific spatial need arises, may employ a rocker arm (not shown) to lessen the external dimensions of an inventive OPE. Still further, even a push-rod valve actuation system may be integrated into each of the modular valve assemblies 40, 42.

FIGS. 8 and 9 provide separate listings of other components making up, or associated with, the intake valve assembly 40 (FIG. 8) shown in FIG. 4B or exhaust valve assembly 42 (FIG. 9) shown in FIG. 4D.

As noted above, because an inventive OPE includes removable intake and exhaust valve assemblies, an inventive OPE does not include a typical cylinder head as in a traditional engine. This provides a number of advantages. For example, a cylinder head may function as a heat sink due to the fact that it typically comprises a large surface area and it is proximate to combustion events, thereby exposing the head to the entirety of the heart discharged by the combustion events. This typically leads to a loss of energy due to the conversion of energy form work into heat. However, because the inventive OPEs do not use a typical cylinder head, such losses are minimized (i.e., the inventive OPEs convert more fuel into work and less into heat than typical, traditional engines). Further, the inventive modular, removable valve assemblies (e.g., intake and exhaust assemblies) allow for ease of servicing, lowered production costs. In embodiments the modular intake and exhaust assemblies 40, 42 may be directly affixed (connected) to a cylinder (e.g., cylinder 2), thus increasing the overall simplicity and practicality of the inventive OPE 1. That is to say, in general, because the inventive OPEs do not need to incorporate a cylinder head the intake and exhaust assemblies can be directly connected to the engine block, rather than be connected to the head. As a result, the inventive OPEs may be more compact and weigh less than traditional engines. It should be noted that intake and exhaust valve assemblies made a part of an inventive OPE need not necessarily be configured to be actuated in an overhead configuration. Alternatively, such valve assemblies may be actuated by a push-rod and camshaft combination, for example.

Referring back to FIG. 2, in an embodiment an inventive OPE may be configured with one or more camshafts 10a, 10b (only two of the ends or lobes are shown) positioned above and/or below the OPE's 1 center point that is defined by the intersection of the x- and y-axes shown in FIG. 2, where the x-axis represents a geometric plane through the centers of crankshafts 9a, 9b. Yet further, each of the camshafts 10a, 10b may be positioned such that their centers are positioned to the left of the OPE's center point. By so positioning the camshafts 10a, 10b, the mechanism used to drive the camshafts 10a, 10b may be selected from a number of different designs. For example, the camshafts 10a, 10b may be driven by a belt (e.g., neoprene rubber, Kevlar, fibers etc.), chain (metal), gears or by an electrical actuator depending on the requirements of a specific application. It should be noted that a combination of different drive systems may also be used.

As noted previously, OPE 1 may comprise crankshafts 9a, 9b, connecting rods 8a, 8b and pistons 7a, 7b in cylinder 2 of OPE 1 (e.g., four-stroke engine). When connected, the reciprocating motion of the pistons 7a, 7b along the x-axis causes a movement of the rods 8a, 8b and rotation of the crankshafts 9a,9b along the z-axis (directed into the paper in FIG. 2), where the z-axis is the axis around which the pistons move.

Typically, significant efforts may be made to reduce engine vibrations in order to reduce their adverse effects which include reducing the life of an engine, and placing stresses on a system the engine is integrated into.

Accordingly, to balance the crankshafts 9a, 9b (reduce the effect of vibrations) in the x and y-axes the inventors first added appropriate counterweights to the crankshafts using traditional methods. However, because the pistons 7a, 7b and connecting rods 8a, 8b are structurally the same and are moving at substantially the same time (albeit in opposite directions) the inventors discovered that there was little or no need to add counterweights to the crankshafts 9a, 9b to balance the crankshafts of the cylinder 2 along the one-axis (e.g., the z-axis) because the mass of the pistons and the majority of the connecting rods was effectively self-cancelling.

Accordingly, the inventors discovered that the amount of counterweight (i.e., mass) needed to be added to each crankshaft can be dramatically reduced versus existing, conventional engine designs. Said another way, because the reciprocating mass of the pistons and most of the connecting rods 7a,7b and 8a,8b is balanced along the z-axis, little if any counterweight needs to be added to balance each of the crankshafts 9a,9b along the z-axis. Accordingly, counterweight can be subtracted (or reduced) because the objective becomes to balance only the crank pin and the elements of the connecting rod which moves appreciably off the x-axis centerline. Thus, counterweight needs to be added mainly to balance each of the crankshafts along the y-axis. In an embodiment, the mass of counterweight needed to be added to an inventive OPE to balance each of the crankshafts 9a, 9b along the y-axis ("crankshaft counterweight") is substantially equal to the mass needed to address the rotating mass and rotational movement of a crankshaft 9a, 9b that moves appreciably off the cylinder's centerline. In an embodiment, such a crankshaft counterweight may be added to an inventive OPE.

In more detail, to understand an inventive method of balancing crankshafts the mass of each of the opposed pistons of an inventive OPE and approximately 65% of the mass of each of their connecting rods may be treated as being separate from the two crankshafts. The two sets of opposed pistons and their connecting rods have a mirror balancing effect on each other, and as the majority of the connecting rod does not move appreciably off of the cylinder's centerline, it does not require the same amount of counterforce (i.e., counterweight) which a conventional, single cylinder engine would require, for example. Accordingly, the mass that remains to be balanced is (i) the mass of the approximately 35% of the connecting rod, (ii) the mass of the crankshaft's throw, and (iii) the mass of the connecting rod's journal. Thus, the mass of a counterweight that is substantially equal to the mass of all three components can be used to effectively reduce vibrations. Graphically, such reductions in vibrations can be represented as a substantially flat sine wave (i.e., a straight line).

Figure 5:
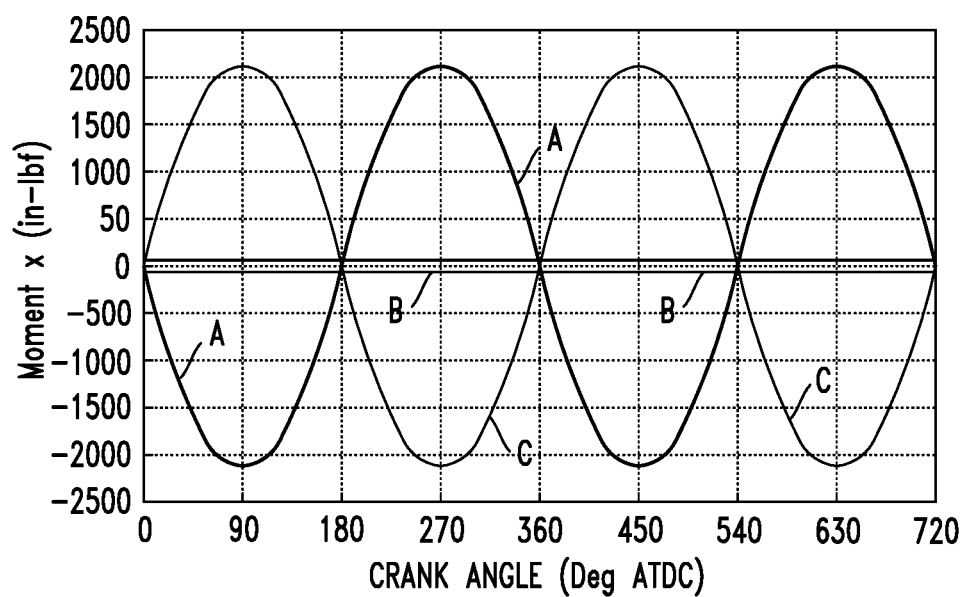
FIG. 5 depicts an exemplary graph that illustrates balancing for an exemplary four-stroke OPE using three different bob weights according to an embodiment of the invention.

For example, FIG. 5 depicts an exemplary graph that illustrates crankshaft balancing for an exemplary four-stroke OPE using three different bob weights (counterweights) according to an embodiment of the invention where in (i) graph A, the bob weight equals 100% of the rotating mass and 61% of the reciprocating mass (first or x-axis motion), (ii) graph B, the bob weight equals 92% of the rotating mass and 0% of the reciprocating mass, and (iii) graph C, there is virtually no bob weight. As depicted, Graph B illustrates that there is little or no vibration (called "Moment-X") along the first or x-axis and therefore, counterweight need only be applied to a crankshaft for balancing in the second or y-axis, therefore reducing the overall weight of the cylinder required to balance the crankshafts and its associated engine while simultaneously reducing vibrational forces.

Though the primary source of an imbalance is typically due to crankshaft vibrations as noted above, vibrations are also introduced by the camshaft and valve configuration and operation. Many times these imbalances are barely noted because they are overshadowed by the vibration profile presented by the crankshaft, connecting rods, and pistons assembly. To reduce the effects of such vibrations a series of small counterweights may be affixed or incorporated into the camshaft to counteract the rotational forces of the imbalanced camshaft and valve configuration resulting in an inventive, reciprocating engine with a barely detectable sine-wave, even in a single cylinder configuration.

Figure 6:
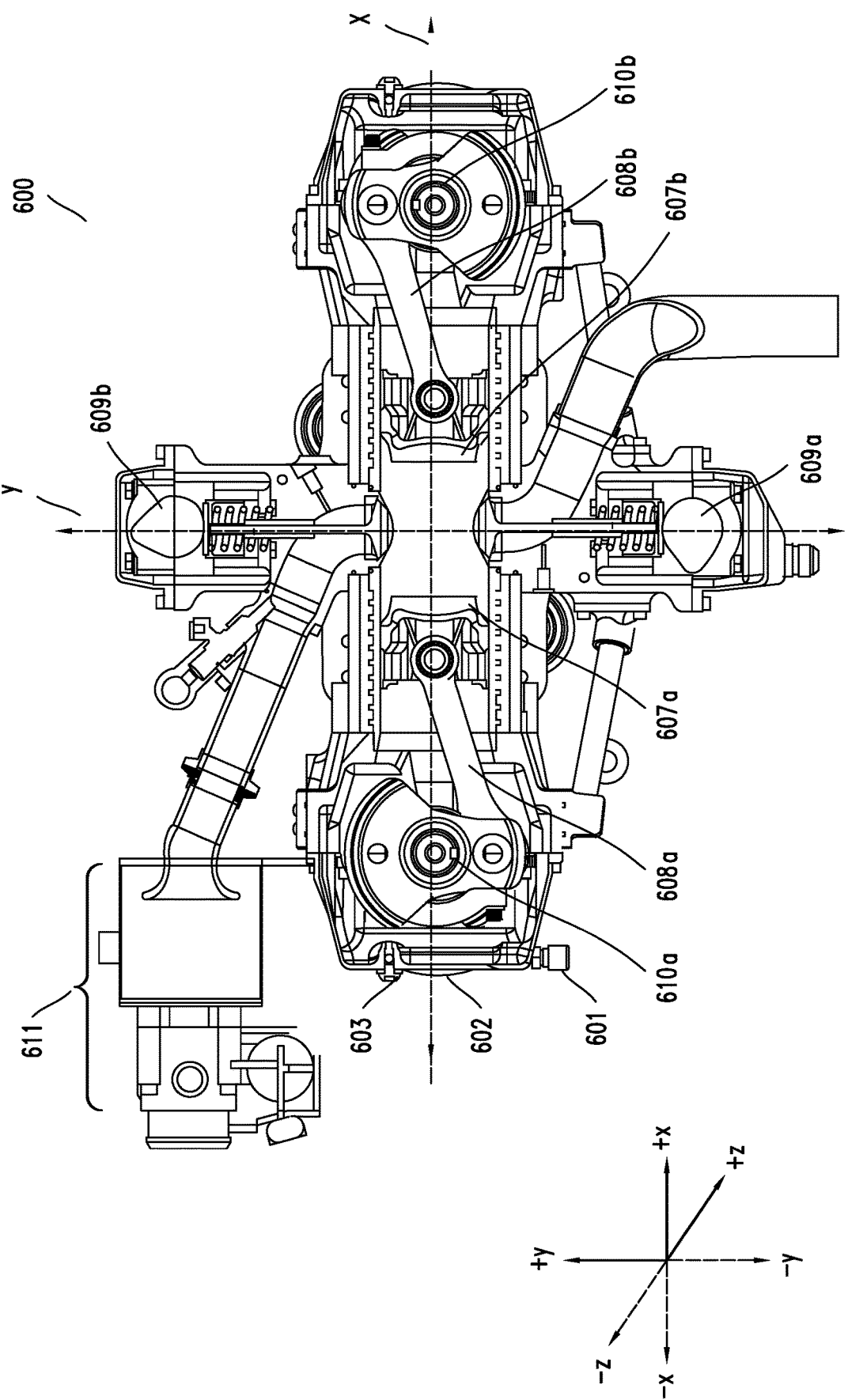
FIG. 6 depicts a cut-a-way view of another inventive, single-cylinder OPE according to an embodiment of the invention. It should be noted that the design of the OPE shown in FIG. 6 may be applicable to an OPE having a plurality of cylinders.

Referring now to FIG. 6 there is shown a cut-a-way view of another inventive four stoke, OPE 600. In an embodiment of the invention, the inventive OPE 100 may include many of the same or similar components as OPE 1 (and vice-versa) and, in addition, include additional features described below or as can be readily discerned from a comparison of the two OPEs 1,600 from the figures.

In an embodiment, OPE 600 may comprise one or more oil supply jets 603 for distributing pressurized oil to internal parts of the OPE 600, such as to the pistons 607a, 607b and connecting rods 108a, 108b. Though only one jet 603 is shown, it should be understood that more than one jet 603 may be incorporated into an inventive OPE 600. Further, pressurized oil to be distributed by the jet 603 may first traverse through a passageway 602, formed as a pipe or formed as an integral channel in a housing, for example, that leads from an oil pump (not shown, that applies pressure to oil) connected to a connector 601. In an embodiment the passageway may be 0.028 inches in diameter, for example.

Upon receiving pressurized oil from the passageway 602 each jet 603 may be configured to distribute the pressurized oil in a spray pattern or jet pattern, to name just two of the many patterns that the jet(s) 603 may use to distribute the oil onto internal parts of the OPE 600. It should be understood that inventive OPE 1 may also incorporate such jets and passageways.

In an embodiment the inventive OPE 600 may be configured with camshafts 609a, 609b (only the ends or lobes are shown) positioned above and/or below the OPE's 600 center point that is defined by the intersection of the x- and y-axes shown in FIG. 6, where the x-axis represents a geometric plane through the centers of crankshafts 610a, 610b. Yet further, each of the camshafts 609a, 609b may be positioned such that their centers are positioned along the OPE's 600 center point. By so positioning the camshafts 609a, 609b, the mechanism used to drive the camshafts 609a, 609b may be selected from a number of different designs. For example, the camshafts 609a, 609b may be driven by a belt (e.g., neoprene rubber, Kevlar, fibers etc.), chain (metal), gears or by an electrical actuator depending on the requirements of a specific application. It should be noted that a combination of different drive systems may also be used. Further, the cam shafts may be push-rod actuated, bucket and shim actuated, finger follower actuated, or use electro and pneumatic actuation.

It should also be noted that the OPE 600 includes a different valve actuating mechanism 611 than OPE 1 that may require different space considerations.

Figure 7B:
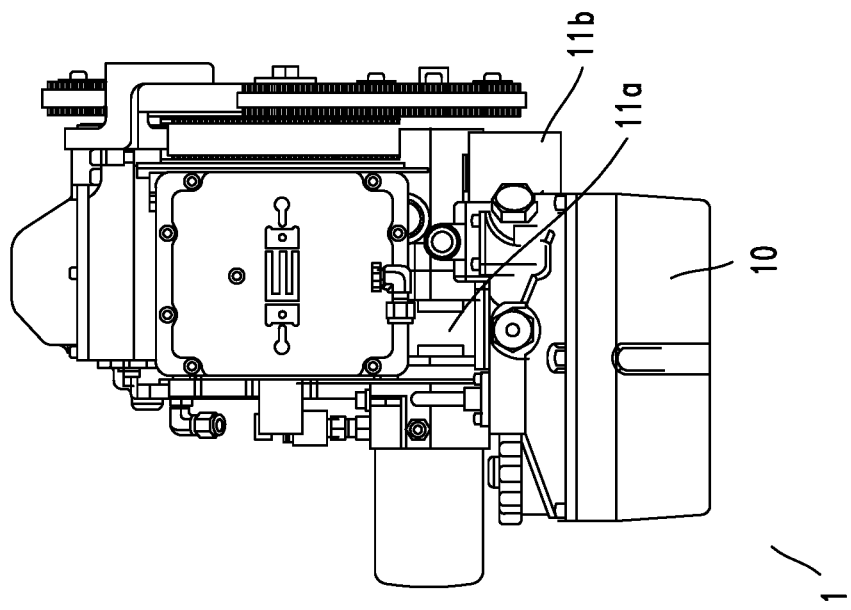
FIGS. 7A and 7B depict back & left side views of an inventive, single-cylinder OPE according to an embodiment of the invention. It should be noted that the design of the OPE shown in FIGS. 7A and 7B may be applicable to an OPE having a plurality of cylinders.
Figure 7A:
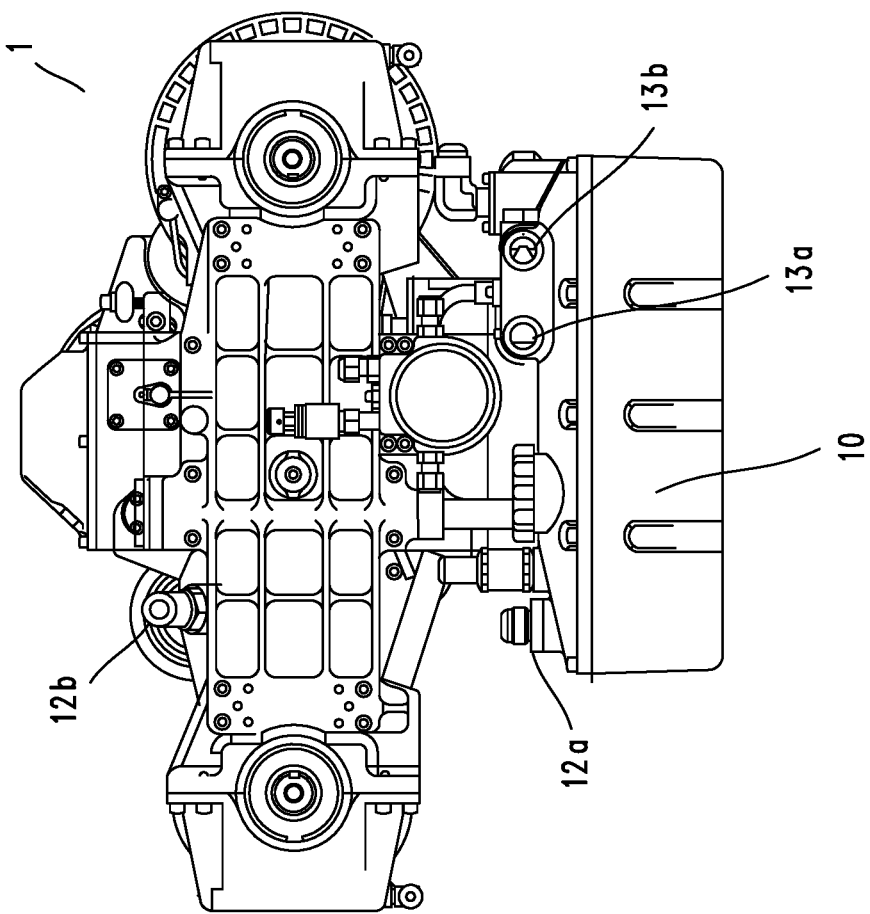

Referring now to FIGS. 7A and 7B there are depicted additional views of the inventive OPE 1. As noted previously, the OPE 1 may comprise a cooling jacket 2a that may be cylindrically shaped, for example. The jacket 2a may be configured to surround the cylinder 2 (not shown in FIG. 7A or 7B, but see FIGS. 3A, 3B). In an embodiment, coolant (e.g., water glycol or a mixture of the two) from the jacket 2a may flow from the outlet 12b to an internal heat exchanger (e.g., coils; not shown, but see component 14 in FIG. 2) that are embedded within oil pan 10, and coolant from the internal heat exchanger 14 may flow into the jacket 2a via inlet 12a after the coolant. In embodiments, the coolant flowing through internal heat exchanger 14 may either absorb heat from the oil within the pan 10 that surrounds the internal heat exchanger 14 during normal operating conditions, or provide heat to the oil in the pan 10 during "cold start" conditions. Thereafter, the coolant from internal heat exchanger 14 may flow through the cooling jacket 2a.

Also shown in FIG. 7B is water pump 11b and an optional stepper motor 11a. In an embodiment, the stepper motor 11a may be configured to control the operation of a guide valve (not shown) that in turn directs the flow of the coolant after the coolant has flowed through the internal heat exchanger 14 within oil pan 10 to either the jacket 2a or to an external heat exchanger (not shown).

In more detail, an operator of the OPE 1 may desire to start the OPE 1 under so-called "cold start" conditions which are characterized by either (i) temperatures that are below an inventive OPE's optimum operating temperature (e.g., below an ambient temperature, i.e. . . . "cold" weather), or (ii) an OPE that has been inactive or abandoned for a significant amount of time such as weeks, months, years or even decades. In such an instance, the stepper motor 11a may be controlled by an engine control subsystem (not shown; e.g., motor controller, microcontroller, programmable controller) that maybe configured to generate one or more stepper motor, coolant control signals that are based on a measured or sensed temperature (e.g., ambient temperature) and sends the signals to the stepper motor 11a. Once received by the stepper motor 11a the coolant control signals are used to control the flow of coolant.

In particular, the stepper motor 11a may be configured to control operation of a guide valve to direct flow of a first coolant percentage (e.g., 0 to 100%) of a coolant to the cooling jacket and send a second coolant percentage (e.g., 0 to 100%) of the coolant to an external heat exchanger.

For example, the stepper motor 11a may control the positioning/movement of the guide valve such that substantially 100% of the heated coolant from the internal heat exchanger 14 is sent back to the jacket 2a through the water pump 11b in order to quickly start the OPE 1. In this case, substantially 0% of the heated coolant from the internal heat exchanger 14 may be directed by the valve to an external heat changer (external heat exchanger not shown; e.g., a water tank/hydronic heat exchanger that is part of a combined heat and power system) via inlet 13b.

However, when it is unnecessary to start or operate the OPE 1 under cold start conditions (e.g., when the temperature of the OPE 1 is above a desired temperature (e.g., 160° F. —a non-limiting temperature) the stepper motor 11a may be further configured to control the valve such that substantially 100% of the hot coolant from the internal heat exchanger 14 is sent to the external heat changer via water pump 11b (e.g., electrical and/or mechanical water pump) and inlet 13b that is connected to the external heat exchanger (not shown), for example. Coolant sent to the external heat exchanger may return to the OPE 1 via outlet 13a, for example.

Still further, rather than send 100% of the heated coolant to the cooling jacket 2a or to an external heat exchanger, the stepper motor 11a may be configured to send a percentage that is less than 100 to the cooling jacket 2a and to the external heat exchanger (e.g., 50% is sent to the cooling jacket 2a, and 50% is sent to the external heat exchanger to name just one of the many percentages).

The claim language that follows below is incorporated herein by reference in expanded form, that is, hierarchically from broadest to narrowest, with each possible combination indicated by the multiple dependent claim references described as a unique standalone embodiment.

While benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

We claim:

1. A four-stroke opposed piston engine (OPE) comprising:
one or more cylinders, each of the one or more cylinders comprising a pair of inwardly opposed pistons;
a cooling jacket configured to cool the one or more cylinders, and comprising one or more fins to increase the surface area of the cooling jacket to expose coolant flowing inside the jacket to air; and
an intake aperture in each of the one or more cylinders for receiving a removable, modular intake valve assembly comprising a modular intake valve assembly seat body connected to a respective intake aperture by insertion of the intake valve assembly seat body into the intake aperture to enable a flow of combustion air into an interior of the one or more cylinders, and an exhaust aperture in each of the one or more cylinders for receiving a removable, modular exhaust valve assembly comprising a modular exhaust valve assembly seat body connected to a respective exhaust aperture by insertion of the exhaust valve assembly seat body into the exhaust aperture to enable that a flow of exhaust and combustion by-products out of the interior of the one or more cylinders.

2. The OPE as in claim 1 wherein each of the one or more cylinders further comprises a section surrounding a substantially circular or oval opening in the cylinder for receiving an engine connection element.

3. The OPE as in claim 2 wherein the engine connection element comprises a sleeve that is configured to allow better energy transfer from a spark plug inserted into the sleeve to the cylinder.

4. The OPE as in claim 1 further comprising one or more camshafts positioned above and/or below a center point of the OPE.

5. The OPE as in claim 1 further comprising an engine connection element configured to hold an engine component.

6. The OPE as in claim 5 wherein the engine component comprises one of a pressure transducer assembly, glow plug assembly, spark plug, or glow plug direct fuel injector.

7. The OPE as in claim 1 further comprising a crankshaft counter weight for balancing a crankshaft comprising a mass substantially equal to a mass needed to address a rotating mass and rotational movement of the crankshaft.

8. The OPE as in claim 1 further comprising one or more oil supply jets for distributing pressurized oil to internal parts of the OPE in a pattern.

9. The OPE as in claim 8 wherein the internal parts comprise the pistons or connecting rods.

10. The OPE as in claim 1 further comprising an internal heat exchanger embedded within an oil pan.

11. The OPE as in claim 1 further comprising a stepper motor configured to control operation of a guide valve to direct flow of a first coolant percentage of a coolant to the cooling jacket and direct a second coolant percentage of the coolant to an external heat exchanger.

12. The OPE as in claim 1 further comprising an engine control subsystem for controlling the stepper motor that generates one or more stepper motor, coolant control signals based on a measured or sensed temperature.

13. The OPE as in claim 1 wherein the cooling jacket is an integral one piece jacket.

14. The OPE as in claim 1 wherein the cooling jacket comprises a plurality of separate, cooling elements.

15. The OPE as in claim 1 wherein the cooling jacket is configured to surround the one or more cylinders.

16. The OPE as in claim 1 wherein the one or more cylinders comprises a plurality of cylinders, and the cooling jacket comprises a number of cooling jackets, each configured to surround at least one of the one or more cylinders.

17. A method for cooling a four-stroke opposed piston engine (OPE) comprising:
configuring a cooling jacket to surround and cool one or more cylinders of the OPE, each of the one or more cylinders comprising a pair of inwardly opposed pistons,
configuring the cooling jacket to comprise one or more fins to increase the surface area of the cooling jacket to expose coolant flowing inside the jacket to air; and
controlling operation of a guide valve that directs flow of a first, coolant percentage to the cooling jacket and directs a second, coolant percentage to a water tank of a combined heat and power system using a stepper motor based on the temperature of the OPE.

18. The method as in claim 17 further comprising controlling the stepper motor using an engine control subsystem that generates one or more stepper motor, coolant control signals based on a measured or sensed temperature.

19. A method for configuring an opposed piston engine (OPE) without a piston head comprising:
configuring the OPE with an intake aperture in each of one or more cylinders;
configuring the OPE with an exhaust aperture in each of the one or more cylinders;
receiving a removable, modular intake valve assembly in the intake aperture comprising a modular intake valve assembly seat body connected to a respective intake aperture by insertion of the intake valve assembly seat body into the intake aperture to enable a flow of combustion air into an interior of the one or more cylinders, and receiving a removable, modular exhaust valve assembly in the exhaust aperture comprising a modular exhaust valve assembly seat body connected to a respective exhaust aperture by insertion of the exhaust valve assembly seat body into the exhaust aperture to enable a flow of exhaust and combustion by-products out of the interior of the one or more cylinders.

20. The method as in claim 19 further comprising:
actuating the intake and exhaust valve assemblies based on fluid dynamics and mechanical aptitude of the OPE.

* * * * *